Patented Dec. 16, 1924.

1,519,659

UNITED STATES PATENT OFFICE.

CHARLES E. BRADLEY, OF MONTCLAIR, NEW JERSEY, AND JOHN McGAVACK, OF ELMHURST, NEW YORK, ASSIGNORS TO NAUGATUCK CHEMICAL COMPANY, A CORPORATION OF CONNECTICUT.

PROCESS FOR PRODUCING PHOTOGRAPHIC AND OTHER FILMS.

No Drawing.    Application filed August 8, 1921. Serial No. 490,708.

*To all whom it may concern:*

Be it known that we, CHARLES E. BRADLEY and JOHN McGAVACK, both citizens of the United States, residing in Montclair, county of Essex, State of New Jersey, and Elmhurst, L. I., county of Queens, State of New York, have invented certain new and useful Improvements in Processes for Producing Photographic and Other Films, of which the following is a full, clear, and exact description.

This invention relates to processes for producing photographic and other films.

The well-known type of film now used for photographic purposes is composed of celluloid which comprises nitrocellulose and camphor, which are dissolved in amylacetate and other solvents and formed into transparent sheets for supporting a sensitized film.

Two of the principal disadvantages of the nitrocellulose film are expense in preparation and high inflammability. Films of acetylcellulose and viscose have been proposed as substitutes for nitrocellulose films, one of the chief recommendations of each of these materials being its low inflammability. These materials have not come into commercial use generally due to a characteristic which each possesses and which has rendered it unfit to substitute nitrocellulose generally. This characteristic is the tenacity with which each of these substances holds on to the solvent employed in forming a film with the result that a film made from either of these substances when sensitized, exposed to light and developed to produce an image in the usual manner tends to shrink and distort causing an imperfect reproduction. In addition the films made from acetyl cellulose and viscose are not as tough as the nitrocellulose films. The toughness in the nitrocellulose films is partially produced by camphor and a satisfactory substance comparable to camphor has not been found for acetyl cellulose and viscose.

The principal object of the present invention accordingly is to produce a film for photographic or other purposes, having a low inflammability, which may be inexpensively made employing relatively inexpensive components, and which shall without the employment of camphor or similar agent be sufficiently tough to withstand winding and unwinding on spools, the repeated passage through moving picture machines and the usual processes of development, etc.

Films of crude rubber have two well recognized disadvantages, to serve as a support for a light sensitive layer, namely their characteristic tendency to stretch which would result in breaking a coat of the kind mentioned, and their property of absorbing moisture in the form of water or other volatile liquid from the atmosphere and losing partially at least their transparency.

The invention accordingly consists of a thin transparent sheet composed of a rubber compound.

The rubber molecule contains unsaturated bonds which appear to occur as shown in the following formula:

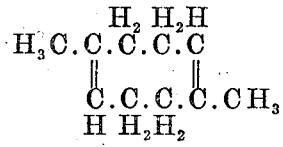

According to the present invention it appears that the disadvantageous properties of crude rubber, namely its tendency to stretch and the impermanency of its transparency may be overcome by forming a rubber compound whose double bonds are saturated. This saturation of the double bonds may be accomplished in any one of a number of ways, care being taken however to avoid excessive breaking down of the rubber molecule itself with a consequent darkening and loss of transparency in the final product.

In preparing a preferred embodiment of the invention 5 kg. of rubber are dissolved in 95 kg. of chloroform and treated with hydrochloric acid gas until a test for the chlorine content shows that 30-35% of chlorine is present. Such percentage of chlorine indicates that the double bond has been saturated. The hydrochloric acid gas may be used without any special precautions being taken to dry it completely. The process of treatment with hydrocholoric acid gas is preferably similar to that described in the application of Bradley and Gibbons, Serial No. 479,100, filed June 20, 1921. It has been found in introducing the hydrochloric acid that increased pressure upon the hydrochloric acid at slightly elevated temperature of the solution effected quicker hydrochlorination. The solution of rubber hydrochloride thus obtained is sometimes of a dark reddish brown color and as this color tends to persist in the resultant film it should be removed if present. In order to effect this removal the flow of hydrochloric acid gas is replaced by a stream of chlorine. 1 to 2% of chlorine based on the weight of rubber hydrochloride present is introduced and the solution is thereby clarified.

Preferably dried air is now bubbled through the chloroform solution to remove excess hydrochloric acid and chlorine. Air is passed until the issuing air contains no more of these substances, as shown by absence of fumes when strong ammonia is held near the issuing air current or a negative reaction of blue litmus is obtained when the water extract of the hydrochlorinated material is tested. After removal of excess acid and chlorine the material is strained and passed through a filter to remove any dust particles or rubber hydrochloride which may have become coagulated during passage of air through the solution. To 100 kg. of chloroform rubber hydrochloride solution containing 7-9% of the hydrochloride is now added 40 to 60 kg. of acetylene tetrachloride.

With acetylene tetrachloride is preferably added 1 to 5% of pine oil based on the weight of the rubber hydrochloride. This material dissolves readily in acetylene tetrachloride, and is readily miscible with the combined solution of acetylene tetrachloride, chloroform and rubber hydrochloride. The material is an antacid and serves effectually to prevent any tendency to decompose which may appear in the rubber hydrochloride. The material as so prepared is spread to a uniform desired thickness on glass or other smooth polished surface and upon evaporation of the solvent the film is obtained. The film is now treated with a sensitized emulsion of gelatin and silver salt and suitably dried in dust-free air. It may then be coated and wound on suitable spools to provide the usual film rolls employed for moving picture machines or other cameras.

The film obtained by the present invention has a transparency similar to the usual nitrocellulose film employed for photographic purposes. It no longer has the tendency to stretch possessed by crude rubber but also resembles in this characteristic the nitrocellulose film. The film does not absorb water or other volatile liquids from the air and has a permanent transparency. It has a low inflammability and does not show the tendency to retain the solvent as in the case of acetyl cellulose and viscose films, and photographic images thereon are therefore not apt to become distorted. It has been found that strips of the film may be spliced together by the use of acetylene tetrachloride, choloroform, benzol or a combination of these solvents, and a length of such spliced film has been perforated to be passed through a moving picture machine and repeatedly passed through such machine without wear greater than that experienced in similar passage of nitrocellulose films. The rubber hydrochloride film it will be seen is made by an inexpensive process employing inexpensive components.

The bromide and iodide, the hydrobromide and hydroiodide of rubber have been prepared but it has been found that these substances are more expensive than the material prepared by the present process and in addition are less stable.

It will be understood that films may be made directly from acetylene tetrachloride solution alone without the presence of chloroform or other low boiling solvent. Chloroform is added in order that the speed of drying may be increased. Acetylene tetrachloride is preferably present in order to insure that the last portion of solvent evaporated is a high boiling solvent so that there may be no tendency to formation of a brittle film or a film discolored by moisture condensed from the air through rapid evaporation.

If desired a film may be made employing only a high boiling solvent. For example, 5 kg. of rubber are dissolved in 95 kg. of acetylene tetrachloride and treated with hydrochloric acid gas in the usual manner and the film is formed directly from this material.

It will be understood that benzol may be employed to replace chloroform entirely or in part as a constituent having a low boiling point where such constituent is used.

It will also be understood that materials other than pine oil mentioned as an antacid may be employed. In general we have found that terpenes containing one double bond are preferably employed for such purpose. For pine oil may be substituted accordingly turpentine, dipentene, pinene, limonene, etc., in amounts approximately the same as indicated for pine oil. If desired dyes may be added to color the film.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. A film consisting of a thin sheet composed of rubber having its double bonds saturated with a halogen acid.

2. A film consisting of a thin sheet composed of rubber having its double bonds saturated with hydrochloric acid.

3. A film consisting of a transparent thin sheet of rubber dihydrochloride, containing approximately 34% chlorine.

4. A photographic film consisting of a thin transparent sheet composed of rubber having its double bonds saturated by hydrochloric acid.

5. A film consisting of a thin transparent sheet composed of a rubber compound containing an anti-acid material.

6. A film consisting of a thin sheet composed of rubber having its double bonds saturated and containing a halogen comprising an anti-acid material.

7. A film consisting of a transparent thin sheet of rubber dihydrochloride, containing approximately 34% chlorine combined with pine oil.

Signed at New York, New York, this 1st day of August, 1921.

CHARLES E. BRADLEY.

Signed at Hamilton, Va., this 3rd day of August, 1921.

JOHN McGAVACK.

DISCLAIMER 1,519,659.—*Charles E. Bradley*, Montclair, N. J., and *John McGavack*, Elmhurst, N. Y. PROCESS FOR PRODUCING PHOTOGRAPHIC AND OTHER FILMS. Patent dated December 16, 1924. Disclaimer filed September 5, 1939, by the assignee, *Marbo Patents, Inc.*

Hereby enters this disclaimer to any interpretation of claim 5 that would include other rubber compounds than rubber hydrochlorides.

[*Official Gazette October 3, 1939.*]